(12) United States Patent
Kubo

(10) Patent No.: US 7,043,155 B2
(45) Date of Patent: May 9, 2006

(54) CONTROL APPARATUS FOR OPTICAL APPARATUS

(75) Inventor: Kenichi Kubo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 10/803,368

(22) Filed: Mar. 17, 2004

(65) Prior Publication Data

US 2004/0204911 A1 Oct. 14, 2004

(30) Foreign Application Priority Data

Mar. 25, 2003 (JP) ............................. 2003-083144

(51) Int. Cl.
*G03B 43/00* (2006.01)
(52) U.S. Cl. ...................................... 396/88
(58) Field of Classification Search ................ 396/88; 702/187; 348/187
See application file for complete search history.

(56) References Cited

U.S. PATENT DOCUMENTS 6,313,868 B1 * 11/2001 D'Alfonso et al. ........... 348/72

* cited by examiner

*Primary Examiner*—W. B. Perkey
(74) *Attorney, Agent, or Firm*—Morgan & Finnegan, LLP

(57) ABSTRACT

A control apparatus is disclosed, which can check an operation history of an optical apparatus and can allow a user to perform optical apparatus maintenance appropriately timed according to the operation history. The control apparatus includes a history generating section which generates history information concerning an operation history of an optical apparatus having an optical adjustment unit and an information output section which outputs at least one of the history information generated by the history generating section and information generated based on the history information.

10 Claims, 12 Drawing Sheets

CONTROL APPARATUS FOR OPTICAL APPARATUS

BACKGROUND OF THE INVENTION

1. Field of the Invention

The present invention relates to a control apparatus for an optical apparatus such as a zoom lens.

2. Description of the Related Art

FIG. 12 shows a configuration of a conventional TV camera zoom lens. In the conventional TV camera zoom lens, when a command signal is inputted from an unillustrated lens controller, a CPU 103 as a controller outputs a control signal in response to the command signal, and this control signal is converted to an analog signal by a D/A converter 107 for inputting into a motor driving circuit 106. Thereby, a motor 105 is driven, and the position and speed of the movable lens unit 101 as an optical adjustment unit are controlled.

The position and speed of the movable lens unit 101 are detected by the CPU 103 via a potentiometer 102 and an A/D converter 104, and feedback control of the position and speed of the movable lens unit 101 is carried out.

In addition, in terms of a zoom lens which is often used while being carried with a camera on a shoulder for news coverage, etc., optical adjustment units such as a zoom unit, a focus unit, and an iris unit are often manually operated by rotating operation rings for operating those directly by hand, therefore, operation sensitivity of the operation rings is also regarded as important.

And, in order to avoid deterioration in the operation sensitivity of such operation rings and operation accuracy of the electrically controlled optical adjusting means as a result of a change over time, the zoom lens requires periodical maintenance such as cleaning, grease up, and optical adjustment.

Here, the frequency of use and time of use of zoom lenses are different depending on the users, and every zoom lens has a different lens condition for a fixed period after purchase. In addition, even when the same user uses a plurality of zoom lenses, ordinarily, the respective lenses are in different conditions.

However, in conventional zoom lenses, since there is no method for checking the history of use (operation history) such as the time and frequency of use, usage conditions, etc., maintenance is performed for all zoom lenses every fixed period of time uniformly. Namely, waste occurs in performing maintenance when in fact maintenance may not be required.

SUMMARY OF THE INVENTION

It is an object of the present invention to provide a control apparatus for an optical apparatus, which can check an operation history of an optical apparatus, and an optical apparatus using the same, and an image-taking system, and furthermore, a control program which handles the operation history information.

A control apparatus of one aspect of the present invention comprises a history generating section which generates information concerning operation history of an optical apparatus having an electrically controllable optical adjustment unit, and an information output section which outputs at least one of the history information generated by the history generating section and information generated based on the history information.

In addition, an optical apparatus of a second aspect of the present invention comprises an electrically controllable optical adjustment unit and the above control apparatus.

In addition, an image-taking system of a third aspect of the present invention comprises the optical apparatus of the second aspect and an image-taking apparatus, on which this optical apparatus can be mounted. Herein, the image-taking apparatus comprises a display device to display information from the information output circuit.

Furthermore, a control program of a fourth aspect of the present invention comprises a step of receiving by communication information concerning operation history of an optical apparatus from the information output section of the above control apparatus and a step of making a display device display the received information.

Features of the control apparatus, optical apparatus, image-taking system, and control program of the present invention will become apparent upon reading the following detailed description of the embodiments with reference to the drawings.

DETAILED DESCRIPTION OF THE PREFERRED EMBODIMENTS

Hereinafter, an embodiment of the present invention will be described with reference to the drawings.

(Embodiment 1)

Figure 11A:
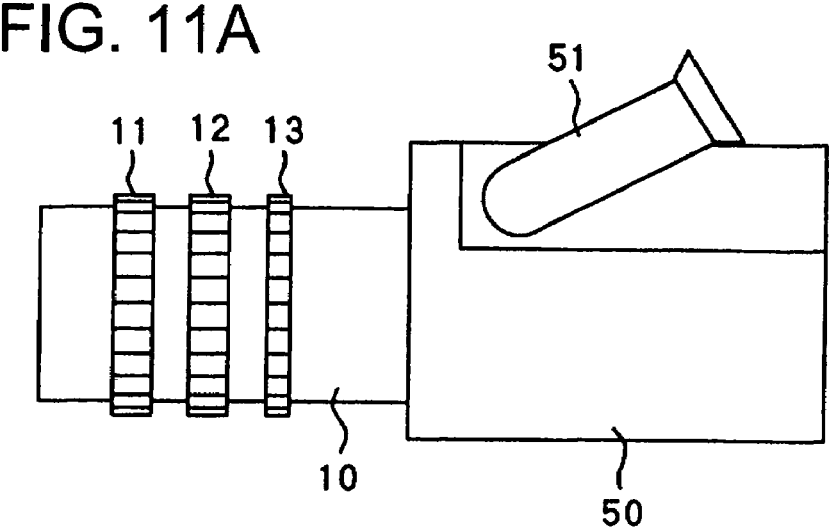
FIGS. 11A to 11C are side and plan views of an image-taking system including a zoom lens mounted with the drive unit of Embodiment 1 and a camera.
Figure 11B:
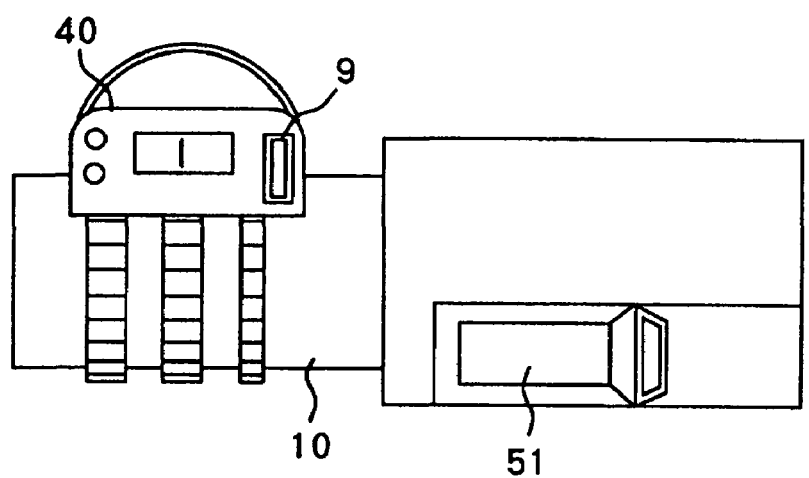

First, FIG. 11A and FIG. 11B show an image-taking system composed of a zoom lens (optical apparatus) 10 mounted with a drive unit 40 as a control apparatus, which is Embodiment 1 of the present invention, and a camera (image-taking apparatus) 50 to which this zoom lens 10 can be attached and detached.

On the zoom lens 10, a zoom operation ring 11, a focus operation ring 12, and an iris operation ring 13 are rotatably provided, and by rotating these operation rings by hand, a zoom lens unit (see FIG. 1), a focus lens unit, and an iris unit (unillustrated) as optical adjustment units can be manually operated via internal drive mechanisms (unillustrated) of the zoom lens 10.

Figure 1:
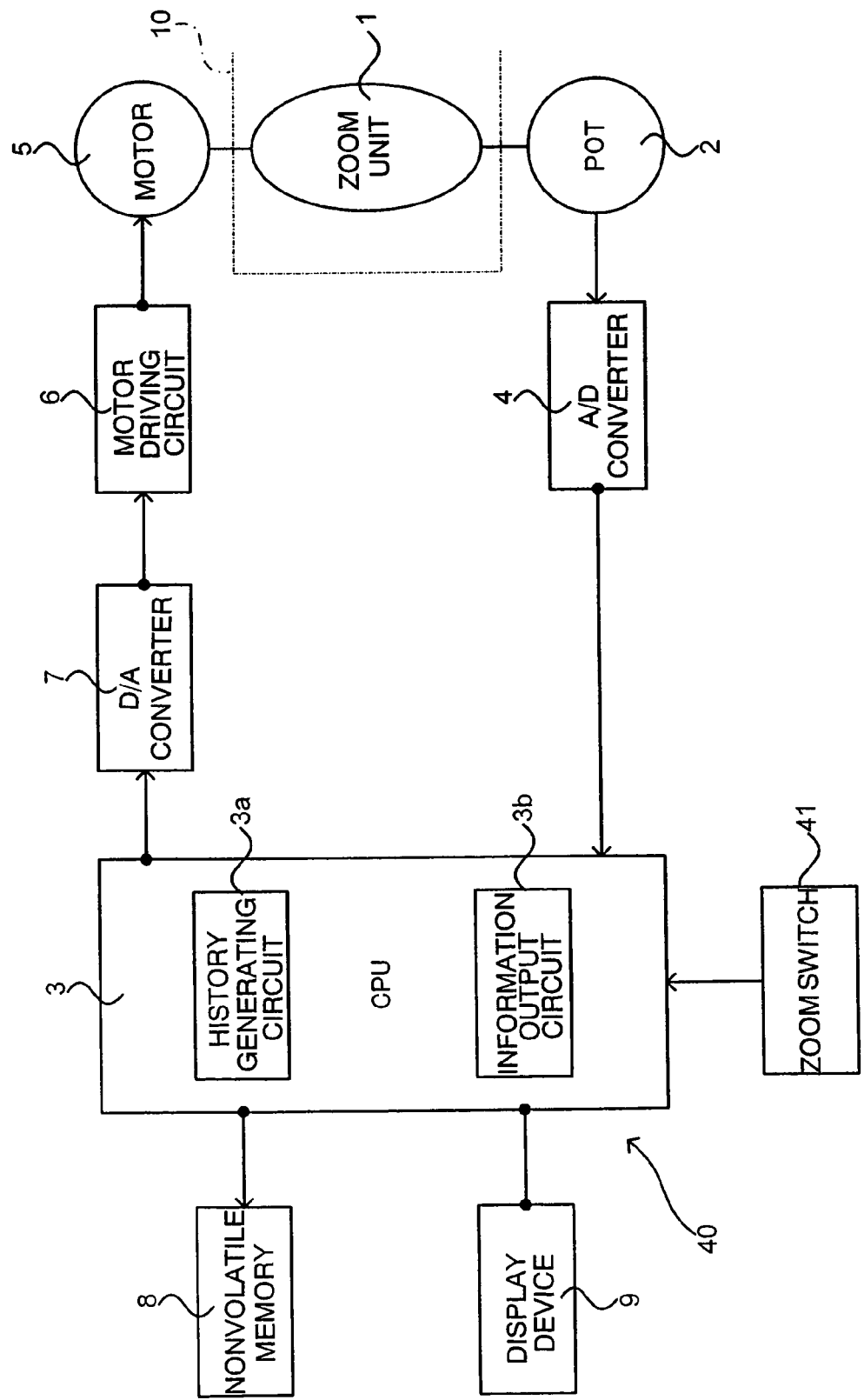
FIG. 1 is a block diagram of an electric circuit of a drive unit which is Embodiment 1 of the present invention.

In addition, as shown in FIG. 11B, the drive unit 40 is attached to the side surface of the zoom lens 10. This drive unit 40 has built-in motors (see FIG. 1, although only a zooming motor is shown in FIG. 1) which can drive the zoom operation ring 11, focus operation ring 12, and iris operation 13. The motors are driven by operating switches provided on the external surface of the drive unit 40, whereby the zoom lens unit, focus lens unit, and iris unit can be electrically controlled.

FIG. 1 shows an electric circuit configuration of the above-described drive unit 40. Reference Numeral 1 denotes a zoom lens unit (hereinafter, simply referred to as a zoom unit) having a variable-power function in the zoom lens 10.

Reference Numeral 2 denotes a potentiometer for detecting a position of the zoom unit 1, which detects a rotation of the zoom operation ring 11 shown in FIG. 1 and outputs a signal according to the rotation. Reference Numeral 3 denotes a CPU as a control apparatus. This CPU 3 has a history generating circuit 3a including a metering circuit 3a1 and an information output circuit 3b.

In response to an input of a zoom command signal from a zoom switch 41 provided in the drive unit 40 or a zoom command signal from an unillustrated zoom demand or lens controller, CPU 3 generates a control signal for the zoom unit while monitoring an output of the potentiometer 2, and outputs the same. In zooming, the value of the zoom command signal increases as the amount of operation of the zoom switch 41 is great, and as the value of the zoom command signal is great, a zoom control signal to drive the zooming motor 5 for driving the zoom unit 1 at a faster speed is outputted.

Reference Numeral 4 denotes an A/D converter for taking a potentiometer 2 output into the CPU 3, and Reference Numeral 6 is a motor driving circuit for driving a motor 5.

Reference Numeral 7 denotes a D/A converter for inputting a control signal (digital signal) from the CPU 3 into the motor drive circuit 6 as an analog signal, Reference Numeral 8 denotes a nonvolatile memory such as an EEPROM, etc. In the nonvolatile memory 8, various types of measured data (information) measured by the history generating circuit 3a (metering circuit 3a1) up until the last time the power was turned off are stored. This measured data will be described later. Reference Numeral 9 denotes a display device using a liquid crystal display and an LED, etc. The display device 9 is provided on the external surface of the drive unit 40, as shown in FIG. 11A and FIG. 11B.

Herein, the power to operate the above electric circuit is supplied from the camera 50 to the drive unit 40 by mounting the zoom lens 10 on the camera 50 and turning on a power source switch (unillustrated) of the camera 50. In addition, power supply to the drive unit 40 is turned off by switching off the power source switch of the camera 50.

Next, operations of the CPU 3 in the present embodiment will be described by use of flowcharts of FIG. 2 to FIG. 4.

When the power is turned on, the process of the CPU 3 proceeds to step (in the drawings, marked as S) 1, and initialization of an internal resistor and internal memory of the CPU 3 is carried out.

Next, in step 2, various types of measured data measured up until the last time the power was turned off are read in from the nonvolatile memory 8. Measured data herein refers to means data of a power ON counter showing an integrated time for which the power has been turned on, data of region counters pos_count1~pos_countN showing stop times according to respective positions (or angles of view) of the zoom unit 1 detected by use of a potentiometer 2 output, and data of speed range counters speed_count1~speed$_{13}$ countN showing operation speeds according to respective operation speeds of the zoom unit 1 calculated based on a potentiometer 2 output. In addition, the read-in data is set as initial values of the power ON counter pow_on_time, region counters pos_count1~pos_countN, and speed range counters speed_count1~speed_countN, respectively.

Next, in step 3, a potentiometer 2 output is inputted from the A/D converter 4, and obtained data is set in position data buffers pos and pos_buf.

Next, in step 4, the power ON counter pow_on_count is incremented. This power ON counter pow_on_count is incremented by 1 each sampling time of the CPU 3 (each time when step 4 is executed while the power is turned on). Accordingly, this counter value is proportional to an integrated value of time for which the power has been turned on (supplied) drive unit 40.

Next, in step 5, the above-described zoom command signal is taken in, a zoom control signal is computed based on this zoom command signal. Concretely, as described above, as the value of the zoom command signal is great, a zoom control signal to drive the zooming motor 5 at a faster speed is computed.

Next, in step 6, the value of the position data buffer pos showing current position data of the zoom unit 1 is transferred to the position data buffer pos_buf showing position data of the zoom unit 1 in the last-time sampling.

And, in step 7, a potentiometer 2 output (an A/D converted value by the A/D converter 4) is stored in the position data buffer pos. Furthermore, in step 8, an absolute value Δpos of a difference between the position data buffer pos_buf showing position data of last-time sampling and position data buffer pos showing current position data is computed by Expression (1).

$$\Delta pos = |pos - pos\_buf| \quad (1)$$

Herein, Δpos computed in step 8 is an amount of change in position data per one sampling time. Namely, Δpos is equivalent to speed data of the zoom unit 1 during that sampling time. Hereinafter, Δpos will be referred to as speed data.

Next, in step 9, whether or not the speed data Δpos is 0 is judged. If the speed data Δpos is 0, the process of the CPU 3 proceeds to step 10 while the zoom unit 1 is regarded as having stopped. On the other hand, if the speed data Δpos is not 0, the process of the CPU 3 proceeds to step 11 while the zoom unit 1 is regarded as being operated (moving).

In step 10, a stop-position-by-stop-position time measurement for measuring at which position and for how long the zoom unit 1 has been stopped is carried out.

Figure 2:
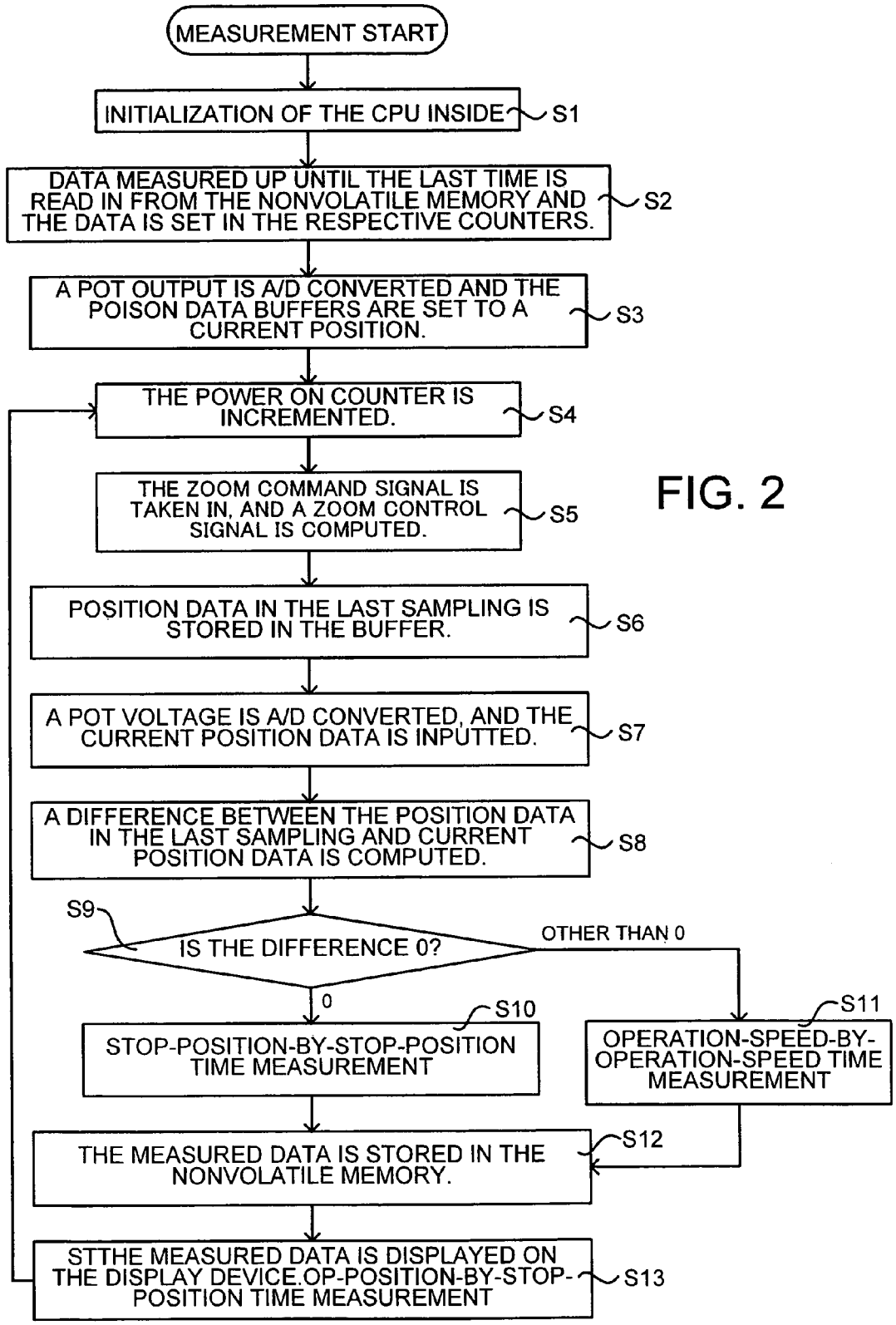
FIG. 2 is a flowchart showing operations of the drive unit of Embodiment 1.
Figure 3:
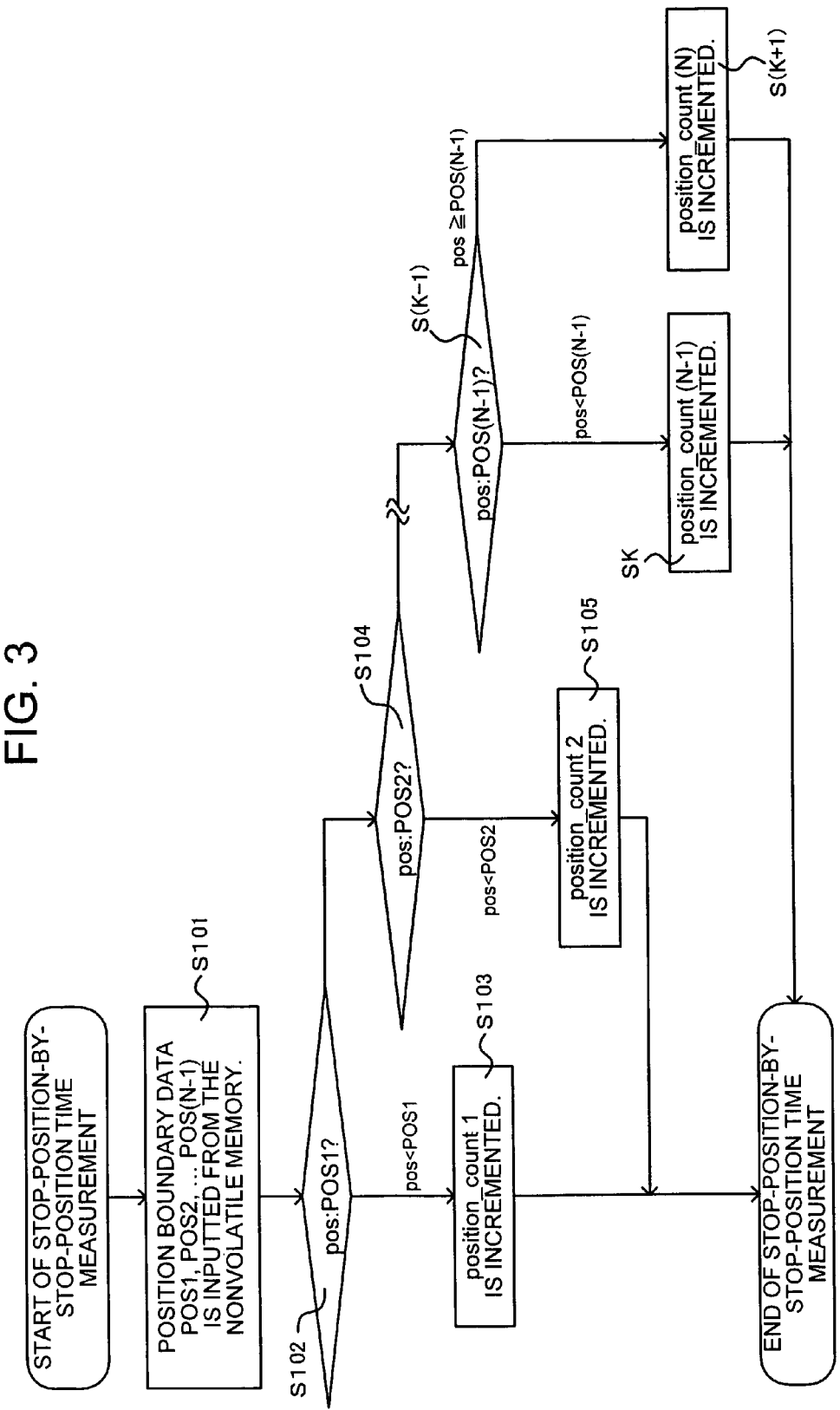
FIG. 3 is a flowchart of a subroutine for measuring times according to stop positions in Embodiment 1.

FIG. 3 shows a flowchart of a subroutine for measuring times according to stop positions. In FIG. 2, if the process proceeds to step 10, the CPU 3 jumps to step 101 of FIG. 3, and position boundary data POS1~POS(N-1) to divide the variation range of zoom position data into N (N is an arbitrary value) is inputted from the nonvolatile memory 8. A relationship among wide-end zoom position data POS_W, tele-end zoom position data POS_T, and boundary data is shown in Expression (2).

$$POS\_W < POS1 < \ldots < POS(N-1) < POS\_T \quad (2)$$

In the present embodiment, as shown in Expression (2), tele-end data is set so as to be greater than wide-end data, however, wide-end data may be set so as to be greater than tele-end data as shown in Expression (3).

$$POS\_T < POS1 < \ldots < POS(N-1) < POS\_W \quad (3)$$

Next, in step 102, the position data buffer pos showing a current zoom position and boundary data POS1 are compared, and if the position data buffer pos is less than the boundary data POS1, that is, if the current zoom position (pos) is at a further wide-angle side than the boundary data POS1, the process proceeds to step 103, wherein a region counter position_count1, which is a stop-position-by-stop-position time counter from the wide-end data POS_W to the boundary data POS1, is incremented. Then, the measuring time according to stop positions is ended, and the process jumps to step 12 of FIG. 2.

In step 102, if the position buffer pos showing a current zoom position is greater than the boundary data POS1, that is, if the current zoom position (pos) is at a further tele side than the boundary data POS1, the process proceeds to step 104, wherein the position data buffer pos and boundary data POS2 are compared.

In step 104, if the position data buffer pos is less than the boundary data POS2, that is, if the current zoom position (pos) is at a further tele-side than the boundary data POS1 and at a further wide-angle side than the boundary data POS2, the process proceeds to step 105, wherein a region counter position_count2 from the boundary data POS1 to the boundary data POS2 is incremented.

In step 104, if the position data buffer pos is greater than the boundary data POS2, thereafter comparisons between the position data buffer and boundary data POS3, . . . , POS(N−2) are carried out in order, and if it is judged the position data buffer is less (at a further wide-angle side) than the then boundary data, a region counter between this boundary data and boundary data at a subsequent wide-angle side is incremented.

If it is judged that the position data buffer pos is greater than the boundary data POS(N−2), the process proceeds to step (K−1), and the position data buffer pos and boundary data POS(N−1) are compared, and if the position data buffer pos is less than the boundary data POS(N−1), a region counter position_count(N−1) from the boundary data POS(N−2) to the boundary data POS(N−1) is incremented.

In step (K−1), if the position data buffer pos is greater than the boundary data POS(N−1), a region counter position_countN from the boundary data POS(N−1) to the tele-end data POS_T is incremented.

As such, by use of the position data buffer (current position data) pos and the boundary data POS1~POS(N−1), in which region of arbitrarily set regions the zoom unit 1 has been stopped is judged, and the region counters position_count1~position_countN for exclusive use of respective regions are incremented. Values of these counters position_count1~position_countN have a relationship proportional to time. Accordingly, by incrementing the respective counters according to the flowchart of FIG. 3, stop times of the zoom unit 1 according to arbitrarily set regions (positions) can be measured.

In addition, in step 11 of FIG. 2, a measuring time according to operation speed for measuring how fast and for how long the zoom unit 1 has been operating is carried out.

Figure 4:
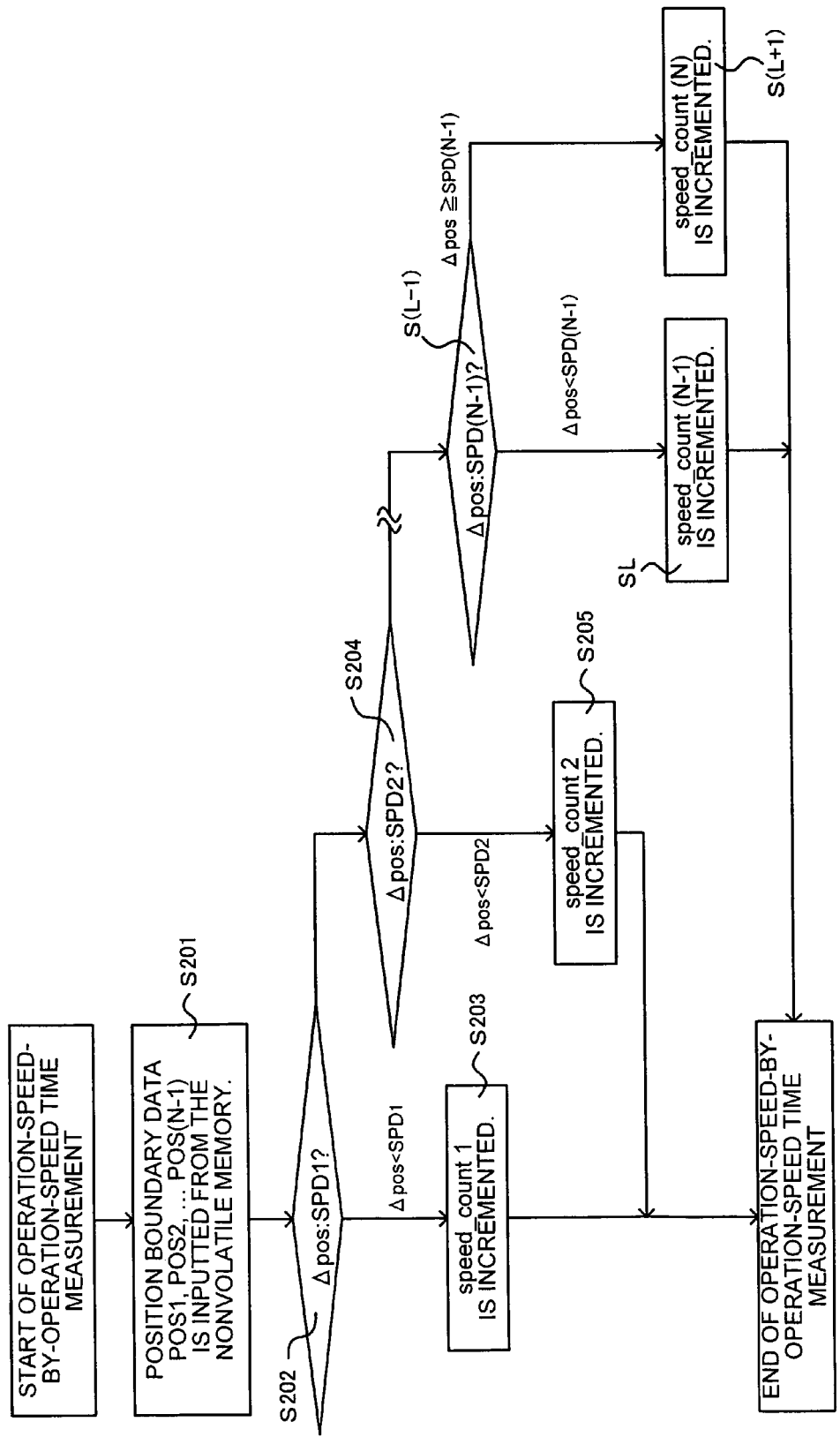
FIG. 4 is a flowchart of a subroutine for measuring times according to operation speeds in Embodiment 1.

FIG. 4 shows a flowchart of a subroutine for measuring times according to operation speeds. In FIG. 2, if the process proceeds to step 11, the CPU 3 proceeds to step 201 of FIG. 4, and speed boundary data SPD1~SPD(N−1) to divide the variation range of zoom operation speed data into N (N is an arbitrary value) is inputted from the nonvolatile memory 8. A relationship among maximum zoom operation speed data SPD_MAX and boundary data is shown in Expression (4).

$$0<SPD1<\ldots<SPD(N-1)<SPD\_MAX \tag{4}$$

Next, in step 202, speed data (difference value data) Δpos showing a current speed and boundary data SPD1 are compared, and if the speed data Δpos is less than the boundary data SPD1, the process proceeds to step 203, wherein a speed range counter speed_count1 for the boundary data SPD1 or less is incremented, and the measuring time according to operation speed is ended, and the process jumps to step 12 of FIG. 2.

In step 202, if the speed data Δpos is greater than the boundary data SPD1, the process proceeds to step 204, wherein the speed data Δpos and boundary data SPD2 are compared. In step 204, if the speed data Δpos is less than the boundary data SPD2, that is, if the current speed (Δpos) is greater than the boundary data SPD1 and is less than the boundary data SPD2, the process proceeds to step 205, wherein a speed range counter speed_count2, which is an operation-speed-by-operation-speed time counter from the boundary data SPD2 to the boundary data SPD1, is incremented.

In step 204, if the speed data Δpos is greater than the boundary data SPD2, thereafter comparisons between the speed data Δpos and boundary data SPD3, . . . , SPD(N−2) are carried out in order, and if it is judged the speed data Δpos is less than the then boundary data, a region counter between this boundary data and boundary data at a subsequent low-speed side is incremented.

If it is judged that the speed data Δpos is greater than the boundary data SPD(N−2), in step (L−1), the speed data Δpos and boundary data SPD(N−1) are compared, and if the speed data Δpos is less than the boundary data SPD(N−1), a speed range counter speed_count(N−1) from the boundary data POS(N−2) to the boundary data POS(N−1) is incremented. In step (L−1), if the speed data Δpos is greater than the boundary data SPD(N−1), a speed range counter speed_countN from the boundary data SPD(N−1) to the maximum operation speed data SPD_MAX is incremented.

As such, by use of the speed data Δpos, which is a difference value of position data, and the boundary data SPD1~SPD(N−1), in which speed range and for how long the zoom unit 1 has been moving can be judged, and by incrementing counters for exclusive use of the speed regions, operation times of the zoom unit 1 according to arbitrarily set speed ranges can be measured.

Subsequently, operations of the CPU3 will be described according to FIG. 2. In step 12 of FIG. 2, data of the power ON counter pow_on_count and data of the region counters and speed range counters (position_count1~position_countN, speed_count1~speed_countN) measured in step 10 and step 11 are stored in the nonvolatile memory 8.

Next, in step 13, by use of the measured data (pow_on_count, position_count1~position_countN, speed_count1~speed_countN) and sampling time Ts (seconds), respective integrated time data (a sum of a time until the last time the power was turned off and a time for which the power has been on this time) is computed, and the result is outputted to the display device 9 to make the same display the data. As an example, an operational expression for displaying a number of hours such as "K hour" on the display device 9 is as in Expression (5).

$$K[\text{hours}]=(pow\_on\_count, position\_countn, speed\_countn) \times Ts/(60[\text{seconds}] \times 60[\text{minutes}]) \tag{5}$$

where n is an arbitrary value of 1~N.

Thereafter, step 4 to step 13 are repeatedly executed until the power supply to the drive unit 40 is turned off (the power source of the camera 50 is turned off).

Herein, the respective types of measured data stored in the nonvolatile memory 8 are reset every time maintenance is performed. Thereby, integrated values (integrated times) of respective types of measured data not only from a point in time where the zoom lens 10 including the drive unit 40 is purchased but also from a point in time where maintenance was performed can be known, and timing to perform maintenance next time can be appropriately determined according to the length of the integrated time (that is, an operation history of the zoom lens 10).

(Embodiment 2)

Figure 5:
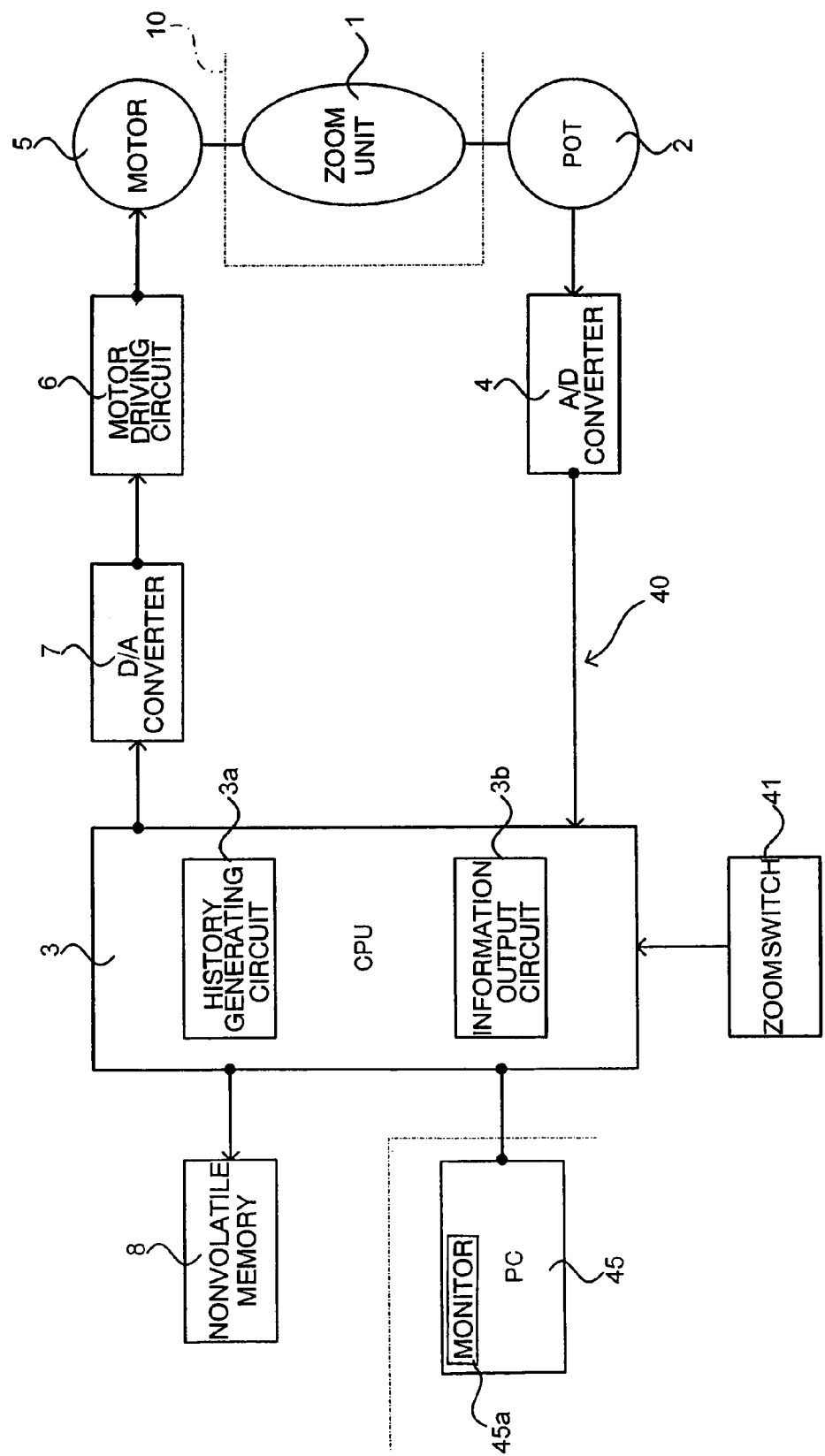
FIG. 5 is a block diagram of an electric circuit of a drive unit which is Embodiment 2 of the present invention.

FIG. 5 shows an electric circuit configuration of the drive unit 40, which is Embodiment 2 of the present invention. In FIG. 5, identical reference numerals are used for components identical to those of Embodiment 1 and description is thereby substituted.

In the present embodiment, a personal computer 45 is connected to the CPU 3 via a serial communications or parallel communications interface connector (unillustrated). In the personal computer 45, a dedicated control program (software) to make a monitor 45a as a display device included in the personal computer 45 display integrated time data showing an operation history of the zoom lens 10 outputted from the CPU 3 has been installed.

Figure 6:
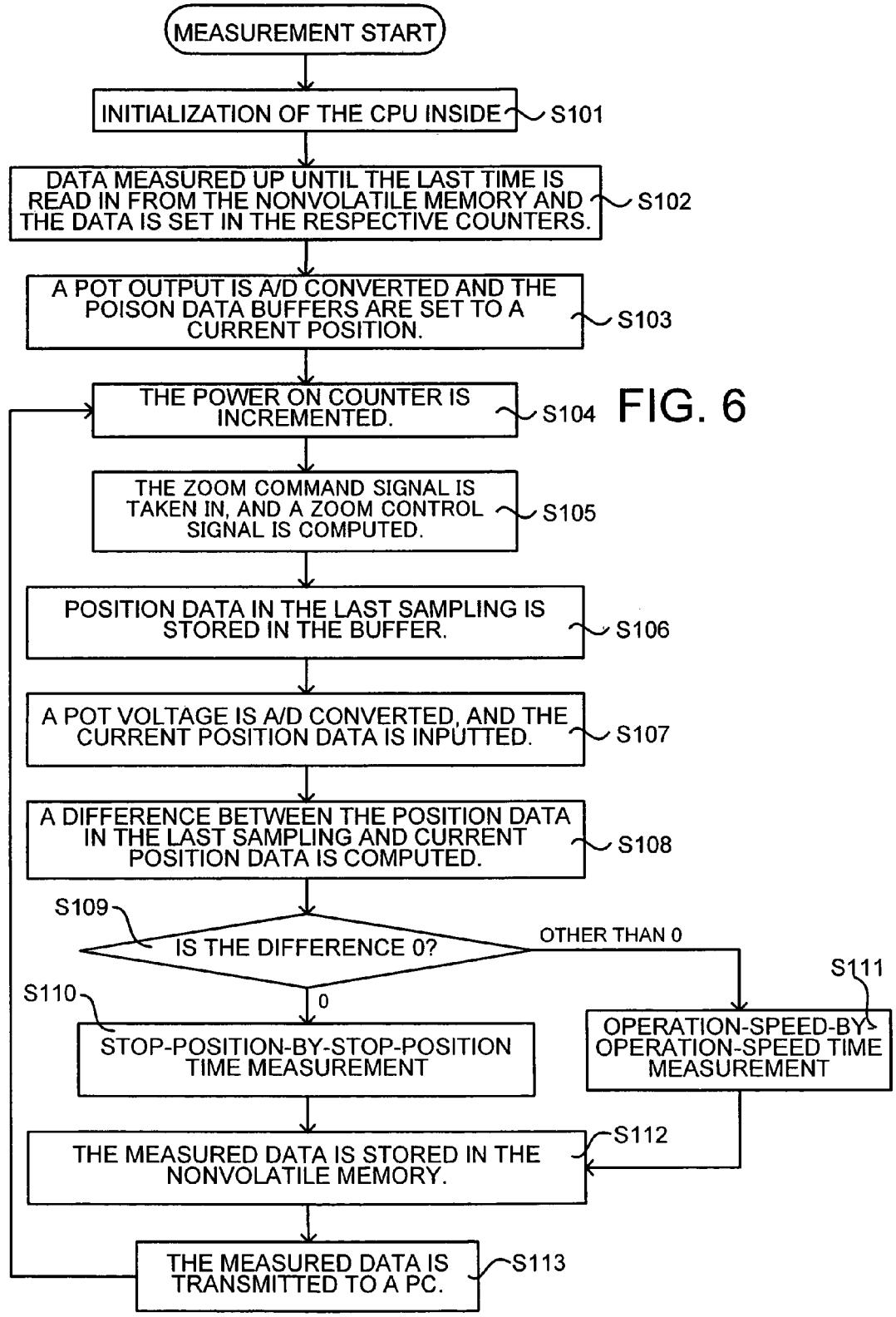
FIG. 6 is a flowchart showing operations of the drive unit of Embodiment 2.

FIG. 6 shows operations of the CPU 3 in the present embodiment. Step 101 to step 112 are identical to step 1 through step 12 of FIG. 2, which have been described in Embodiment 1.

When the series of measurement operations and storing of the measured data into the nonvolatile memory 8 as described in Embodiment 1 are performed at step 101 to step 112, the CPU 3 proceeds to step 113, wherein the measured data is transmitted to the personal computer 45.

The personal computer 45 receives, as a result of the dedicated program being started, the measured data by communication, and computes respective integrated time data by use of Expression (5) provided in the dedicated program, and displays the computation result on the monitor 45a.

Thereafter, step 104 to step 113 are repeatedly executed until the power supply to the drive unit 40 is turned off (the power source of the camera 50 is turned off).

Herein, although, in the present embodiment, description has been given of a case where the measured data is transmitted (outputted) to the personal computer 45, it may also be possible to transmit the measured data to the camera 50 and display the same on a viewfinder 51 provided on the camera 50 as shown in FIGS. 11A and 11B.

(Embodiment 3)

Figure 7:
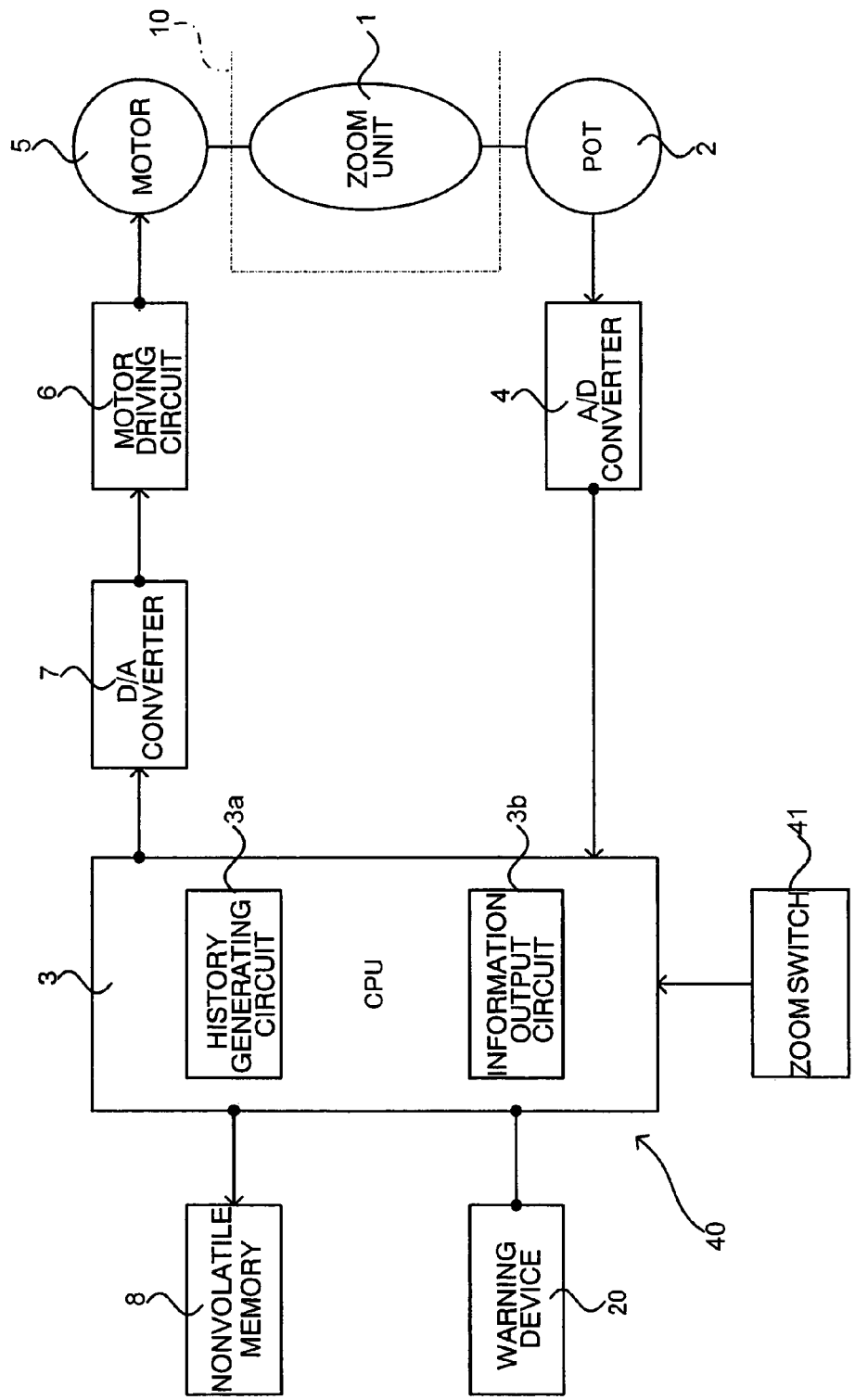
FIG. 7 is a block diagram of an electric circuit of a drive unit which is Embodiment 3 of the present invention.
Figure 8:
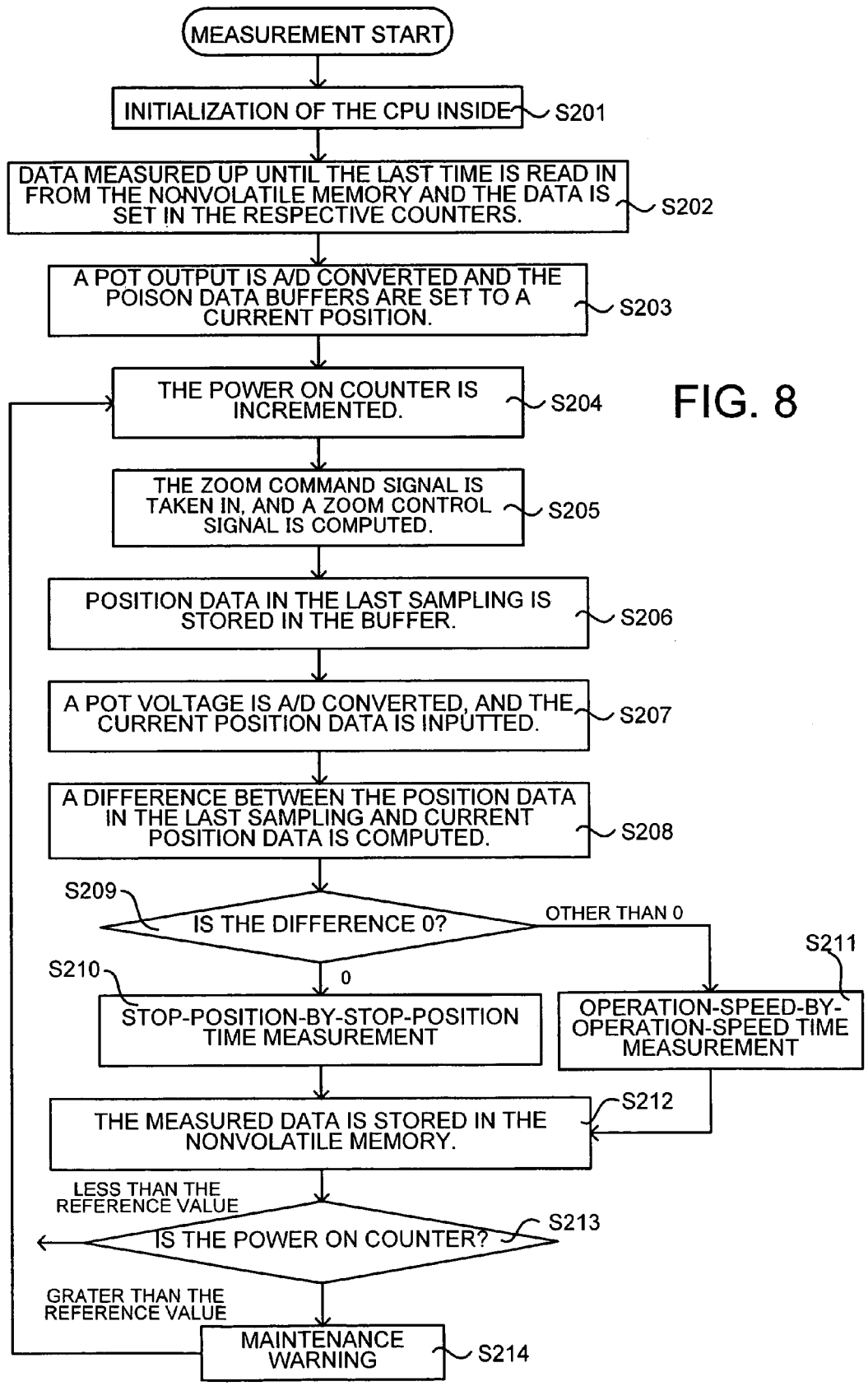
FIG. 8 is a flowchart showing operations of the drive unit of Embodiment 3.

FIG. 7 shows an electric circuit configuration of the drive unit 40, which is Embodiment 3 of the present invention. In FIG. 7, identical reference numerals are used for components identical to those of Embodiment 1 and description is thereby substituted.

Reference Numeral 20 denotes a warning device to notify a warning message to prompt maintenance by a display, voice, or vibration.

FIG. 6 shows operations of the CPU 3 in the present embodiment. Step 201 to step 212 are identical to step 1 to step 12 of FIG. 2, which have been described in Embodiment 1.

When the series of measurement operations and storing of the measured data into the nonvolatile memory 8 as described in Embodiment 1 are performed at step 201 to step 212, the CPU 3 proceeds to step 213, wherein the power ON counter pow_on_count and a preset reference value limit_count are compared. This reference value limit_count is a value calculated by a designer from a number of operating hours where maintenance is presumed to be necessary, and this is set at the time of factory shipment or maintenance.

If the power ON counter pow_on_count is greater than the reference value limit_count in step 213, that is, if the number of operating hours where maintenance is presumed to be necessary is exceeded, the process proceeds to step 214, and a message (for example, "WARNING") to inform a user that maintenance is necessary is displayed on the warning device 20 provided as a display device. In addition, for example, it may also be possible to output a voice message such as "receive maintenance" from a warning device 20 provided as a speaker. Moreover, it may also be possible to make a warning device 20 provided as a vibration source, generate a vibration to that effect.

In step 214, if the power ON counter pow_on_count is less than the reference value limit_count, the process directly jumps to step 204.

Thereafter, step 204 to step 213 are repeatedly executed until the power supply to the drive unit 40 is turned off (the power source of the camera 50 is turned off).

Herein, if the warning device 20 cannot be loaded on the drive unit 40 as in the present embodiment, it may also be possible to connect a personal computer to the drive unit 40 and transmit warning information to the personal computer so as to display a warning message on a monitor of the personal computer or output a voice warning message.

(Embodiment 4)

Figure 9:
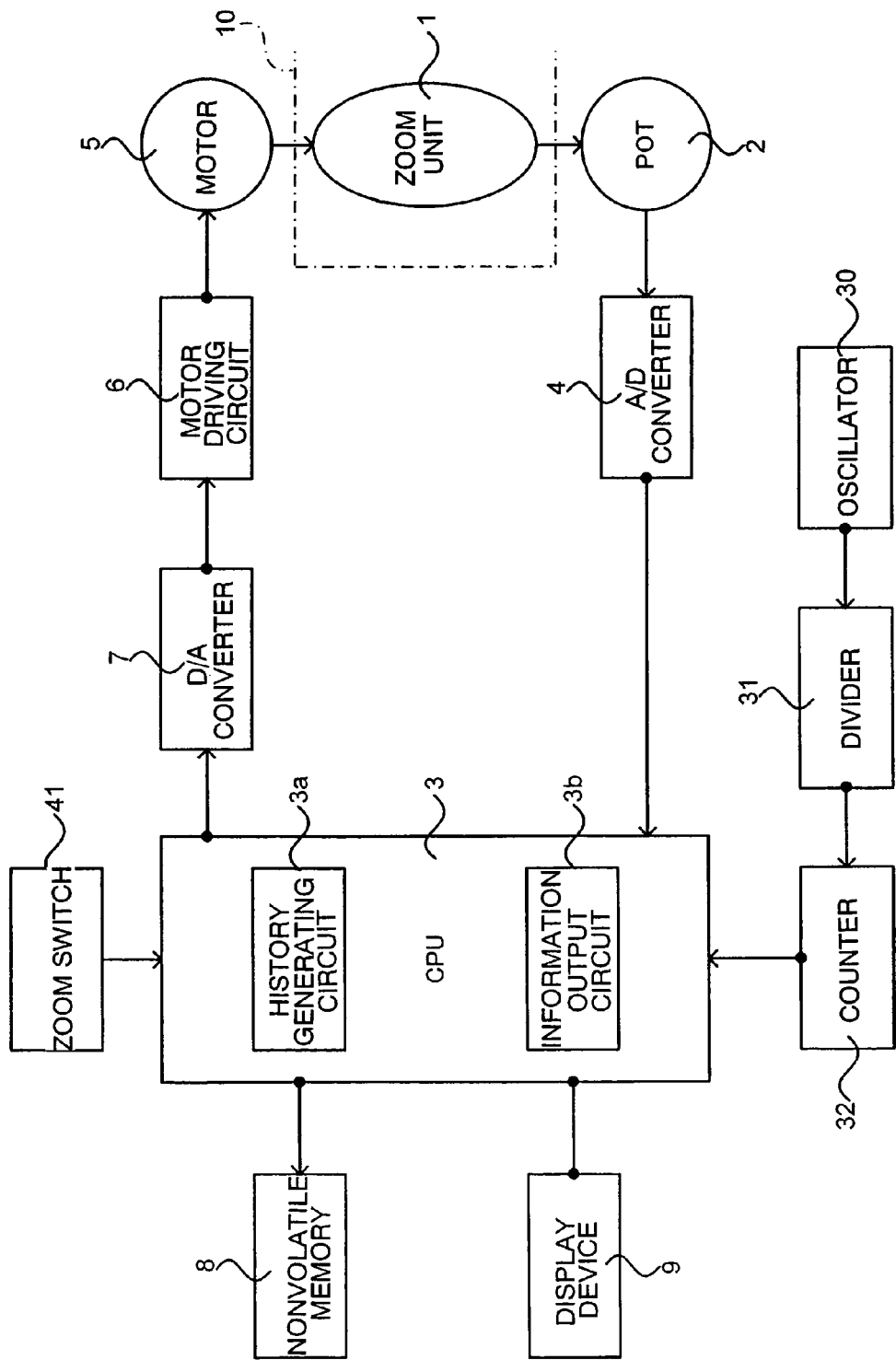
FIG. 9 is a block diagram of an electric circuit of a drive unit which is Embodiment 4 of the present invention.

FIG. 9 shows an electric circuit configuration of the drive unit 40, which is Embodiment 4 of the present invention. In FIG. 9, identical reference numerals are used for components identical to those of Embodiment 1 and description is thereby substituted.

In the present embodiment, the power ON counter, which has been realized by a counter of software in Embodiment 1, is constructed by hardware. In FIG. 9, Reference Numeral 30 denotes an oscillator, Reference Numeral 31 denotes a divider, and Reference Numeral 32 denotes a counter.

Figure 10:
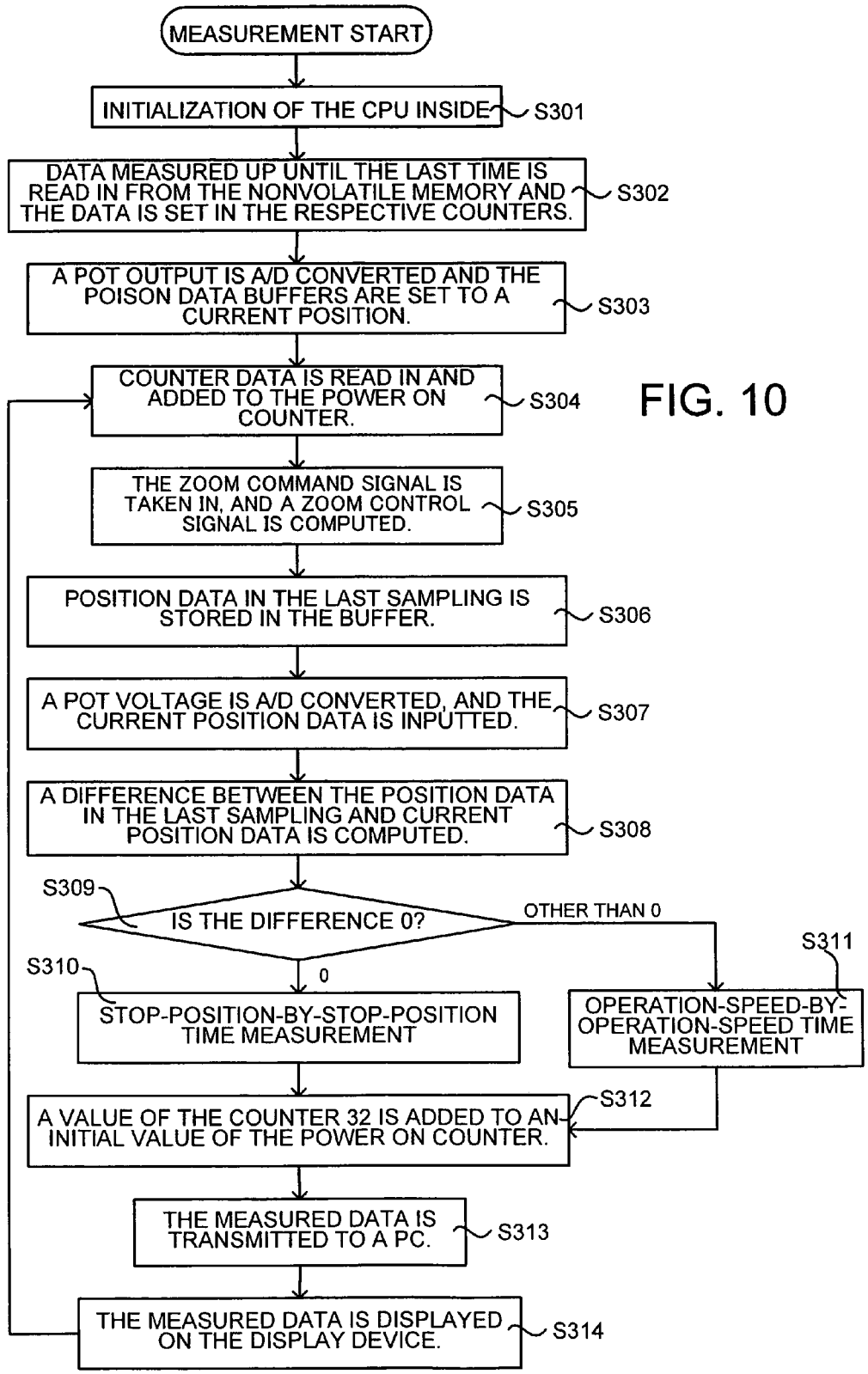
FIG. 10 is a flowchart showing operations of the drive unit of the above Embodiment 3.

FIG. 10 is a flowchart showing operations of the CPU 3 of the present embodiment. Step 301 to step 303 are identical to step 1 to step 3 of FIG. 2 in Embodiment 1.

In step 304, the CPU 3 reads a value of the counter 32, and the process proceeds to step 305.

Step 305 to step 311 are identical to step 5 to step 11 of FIG. 2 in Embodiment 1.

In step 312, a value of the counter 32 is added as an initial value of the power ON counter (Expression (6)). Then, the process proceeds to step 313.

$$pow\_on\_count = pow\_on\_count\_init + count \quad (6)$$

where pow_on_count_init is a set value (initial value) of the power ON counter read in step 302, and count is a value of the counter 32 read in step 304.

Step 313 and step 314 are identical to step 12 and step 13 of FIG. 2 in Embodiment 1.

Thereafter, step 304 to step 313 are repeatedly executed until the power supply to the drive unit 40 (the power source of the camera 50 is turned off).

As such, even when the power ON counter is constructed by hardware, the object of the present invention can be achieved.

In the respective embodiments as described in the above, description has been given for cases where the power ON time and the stop times according to positions and operation times according to operation speeds of the zoom unit 1 are measured, and information of an integrated time of these or information generated based on this information is outputted, however, stop times according to the focus lens unit and iris positions and operation times according to operation speeds may be measured.

Figure 11C:
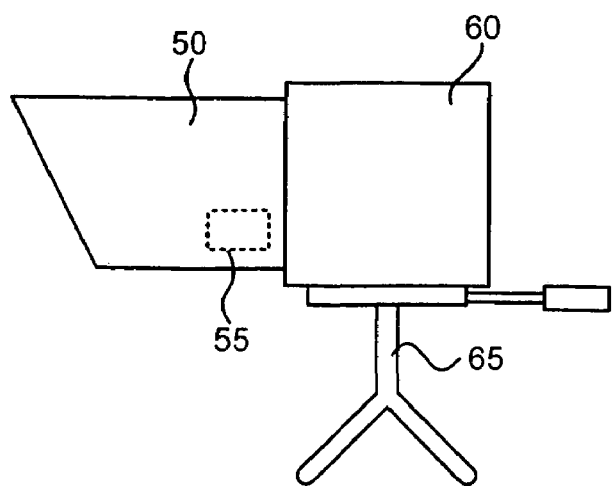
Figure 12:
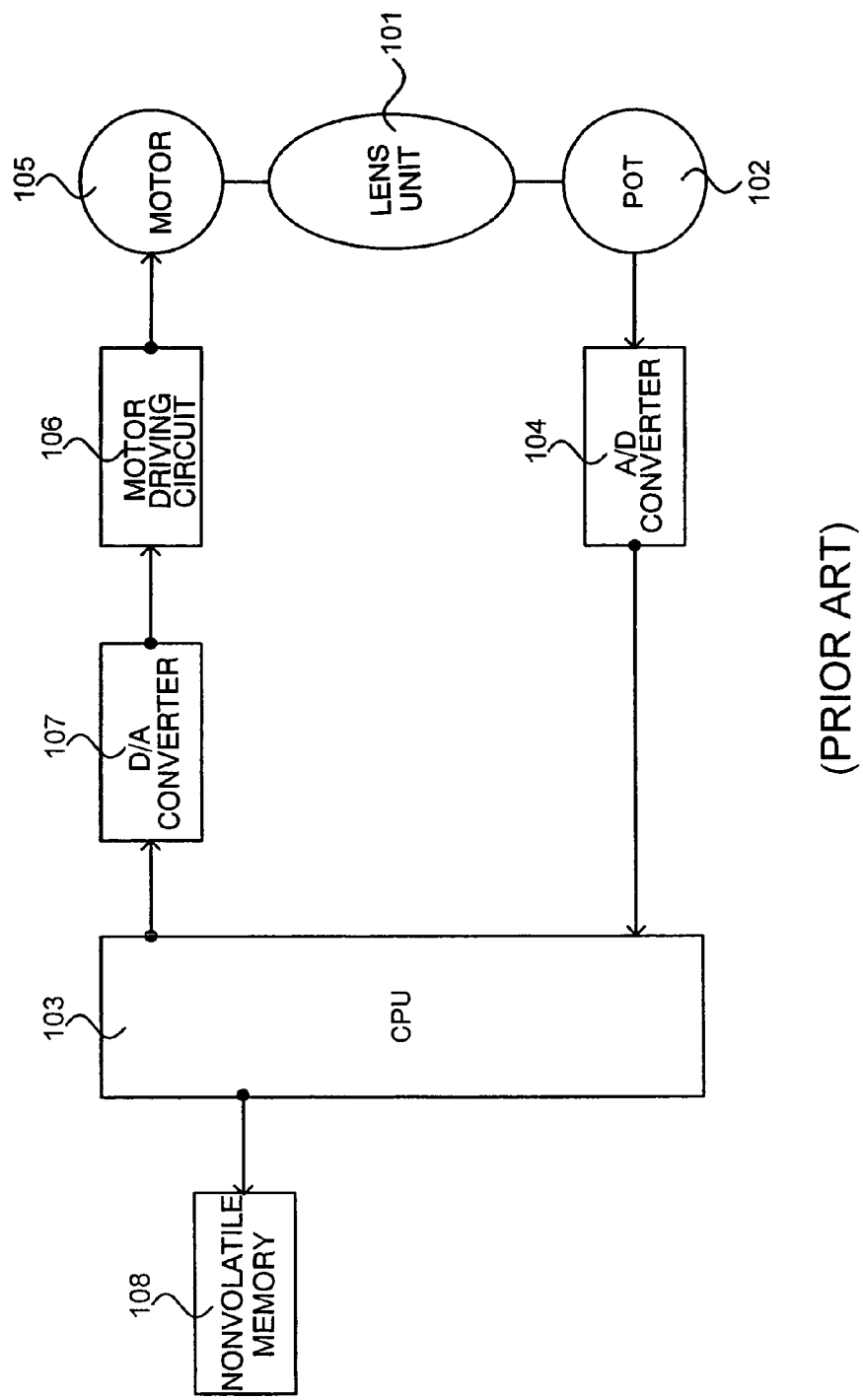
FIG. 12 is a block diagram of an electric circuit of a conventional zoom lens.

In addition, in the respective embodiments, description has been given of a drive unit mounted on a so-called handy-type zoom lens, however, as shown in FIG. 11C, the present invention can also be applied to a zoom lens 50 of a type with a built-in control apparatus 55 having a structure equivalent to that of the drive unit (and a camera 60 on which the same is mounted). FIG. 11C shows a condition where a so-called large-diameter-type zoom lens 50 has been mounted on a camera 60 supported by a supporting member 65.

Furthermore, in some cases, a zoom lens is loaded with an angle-of-view correcting function to drive a zoom unit so as to correct a change in the angle of view as a result of focusing and an image-shake correcting function to, for example, shift a correcting lens unit in the direction orthogonal to the optical axis so as to correct an image shake caused by vibrations of the zoom lens or camera. In such cases, a structure may also be possible so that the CPU obtains information showing an operation history of the respective functions (the zoom lens unit and correcting lens unit) and outputs the information and information generated based on the information.

As described in the above, according to the respective embodiments, it becomes possible to easily check an operation history of the optical apparatus and to perform appropriately timed maintenance according to the operation history.

In the above embodiments, the control apparatuses which perform a digital process are explained, the present invention however can be applied to a control apparatus which performs an analog process.

While preferred embodiments have been described, it is to be understood that modification and variation of the present invention may be made without departing from scope of the following claims.

What is claimed is:

1. A control apparatus for controlling a zoom lens which has an optical adjustment unit and is mountable on a camera, the control apparatus comprising:
   a history generating section which generates a history information concerning operation history of the zoom lens, the history information including time information of the optical adjustment unit; and
   an information output section which outputs at least one of the history information and information generated based on the history information.

2. The control apparatus according to claim 1, wherein the history generating section measures at least one of the following and generates the history information:
   a power ON time of at least one of the control apparatus and the zoom lens;
   a stop time according to drive positions of the optical adjustment unit; and
   a drive time according to drive speed of the optical adjustment unit, and the information output section outputs at least one of information showing the measured time and information generated based on the measured time.

3. The control apparatus according to claim 2, wherein
   the history generating section integrates the measured times and outputs at least one of information showing the integrated time and information generated based on the integrated time.

4. The control apparatus according to claim 1, further comprising:
   a display device which displays information output from the information output section.

5. The control apparatus according to claim 1, which is mounted on the zoom lens.

6. The control apparatus according to claim 1, wherein
   the information output section outputs the information to a camera, and
   the zoom lens is mounted to the camera.

7. A zoom lens comprising:
   an optical adjustment unit; and
   the control apparatus according to claim 6.

8. An image-taking system comprising:
   the zoom lens according to claim 7; and
   a camera, on which the zoom lens can be mounted, wherein
   the camera comprises a display device to display information from the information output section.

9. A control program which operates on a computer to handle information concerning operation history of a zoom lens, the program comprising:
   a step of receiving by communication information from the information output section of the control apparatus according to claim 1; and
   a step of making a display device display the received information.

10. The control apparatus according to claim 1, further comprising a warning device for indicating a condition wherein the zoom lens requires maintenance service, the warning device notifying via display, sound or vibration.

* * * * *